United States Patent
Schoonover

[15] 3,703,321
[45] Nov. 21, 1972

[54] TRACK ASSEMBLY FOR TRACKED VEHICLES

[72] Inventor: Richard H. A. Schoonover, West Linn, Oreg.

[73] Assignee: Formac International, Inc., Seattle, Wash.

[22] Filed: July 31, 1970

[21] Appl. No.: 59,930

[52] U.S. Cl. ..........................305/38, 305/54, 305/57
[51] Int. Cl. .............................................B62d 55/24
[58] Field of Search.....24/37; 305/35 EB, 37, 38, 56, 305/57, 40; 198/193, 195

[56] References Cited

UNITED STATES PATENTS

| | | | |
|---|---|---|---|
| 2,515,128 | 7/1950 | Lammertse | 305/38 |
| 2,487,813 | 11/1949 | Knox | 305/54 X |
| 3,387,897 | 6/1968 | Reid | 305/56 |
| 3,550,968 | 12/1970 | Rymes | 305/35 EB |
| 1,991,545 | 2/1935 | Croft | 24/37 |

FOREIGN PATENTS OR APPLICATIONS

| | | | |
|---|---|---|---|
| 813,281 | 5/1959 | Great Britain | 305/38 |

*Primary Examiner*—Richard J. Johnson
*Attorney*—Christensen & Sanborn

[57] ABSTRACT

A track assembly is designed for application to tracked vehicles having on each side a pair of longitudinally spaced support wheels and a pair of laterally spaced drive sprockets. There are two track assemblies, one on each side. Each assembly includes a pair of laterally spaced endless belts mountable about the wheels and sprockets. A plurality of grousers are fastened in longitudinally spaced relation transversely to the belts. A plurality of wheel guides are fastened to the inner surfaces of the grousers between the belts. The grousers and guides may be cast an integral units, simplifying the structural arrangement and improving its performance.

3 Claims, 5 Drawing Figures

Richard H. A. Schoonover
INVENTOR
BY Eugene D. Farley
Atty.

TRACK ASSEMBLY FOR TRACKED VEHICLES

This invention relates to belted track assemblies for tracked vehicles.

In the operation of track type vehicles a twisting torque is applied to the track whenever the vehicle is run with one side on a bank, or over a rock, stump or other obstacle. This torque puts severe stress into the track and makes mandatory the use of a highly flexible track, such as one including belts, or of a very strong pin and pad linkage system.

A pin and pad system is much too heavy, cumbersome and expensive for practical use. A flexible, single belt, belt-type track of conventional design allows too much twist, so that it can not be retained in position on the track. Also, sufficient strength is difficult to obtain without using an expensive continuous (no splice) belt or one with an expensive overlapping cord hot splice.

In the case of a spliced belt, the splice often is poorly executed. In addition, the lengths of spliced belts often vary so that belt matching and hole spacing for grouser fastening is very difficult. Still further, the splices often are not made properly, so that separation results.

If it is attempted to overcome the foregoing difficulties with the use of multiple splices, such splices are prone to wear excessively and often tear out. The splices also set up uneven timing of the sprockets and grousers.

Still further, when the belt ends are lapped for splicing, the resulting continuous belt becomes twice as thick and much stiffer at the point of splicing. This has several disadvantageous effects.

It results in excessive sprocket and gouser wear, timing problems and annoying bump each time the lap goes through the sprocket. It seriously limits the protective cover and strength of belt which can be used with a lapped splice. It also prevents the employment of a heavier, stiffer belt, which would not be susceptible to twist when crossing obstacles and would give more even ground pressure between support wheels.

In conventional belt-type tracks, the grousers and guides are bolted to the belts, the guides being used as the c lamping members which are opposed to the grousers. Also, single sprockets almost always are used with belted tracks. These factors increase the complexity and cost of track construction and detract from track stability.

Accordingly it is the general purpose of the present invention to provide a two belt belted track assembly for tracked vehicles which overcomes the foregoing problems by employing an integral grouser and guide, as well as lapped spliced belts to which the grouser-guide members may be attached securely in a stable, efficient arrangement. Further advantages of the assembly are:

1. Lighter weight and lower cost.
2. Higher guide strength.
3. Protection of the fasteners by which the grouser is fastened to the belts from heavy stresses resulting from foreign objects becoming lodged between the guides.
4. Ability to use low cost conveyor belting while preserving necessary strength and durability.
5. Prevention of problems resulting from belt splicing, including belt stiffness, bump, belt failure and grouser-sprocket timing problems.
6. Increased track and vehicle stability.
7. Much greater strength.
8. Uniform ground pressure between bogey wheels.
9. Ability to build desired properties of flexibility, strength and stretch into the belts.
10. Correct sprocket alignment.
11. Prevention of track working.
12. Minimal sprocket wear.
13. Track protection.
14. Minimal interference with track performance by debris passing through the sprockets.

The manner in which the foregoing and other objects of this invention are accomplished will be apparent from the accompanying specification and claims considered together with the drawings, wherein:

The herein described track assembly is designed for application on belted track vehicles having on each side at least one support wheel and a pair of laterally spaced drive sprockets. In its broad aspect, the track assembly comprises a pair of laterally spaced endless belts mountable about the wheels and sprockets. A plurality of grousers are arranged in longitudinally spaced relation transversely of the belts, Suitable fastening means fasten the grousers to the belt. A plurality of wheel guides are fastened to the inner surfaces of the grousers between the belts. Preferably, the grousers and guides are fabricated as integrated, unitary members. Preferably also, the belts are fabricated as integrated, unitary members. Preferably also, the belts are fabricated of two laps of belt material having their meeting ends spliced and the splices being bolted or otherwise secured to the grousers. The resulting assembly is characterized by a high degree of stability, superior performance and long life.

Figure 1:
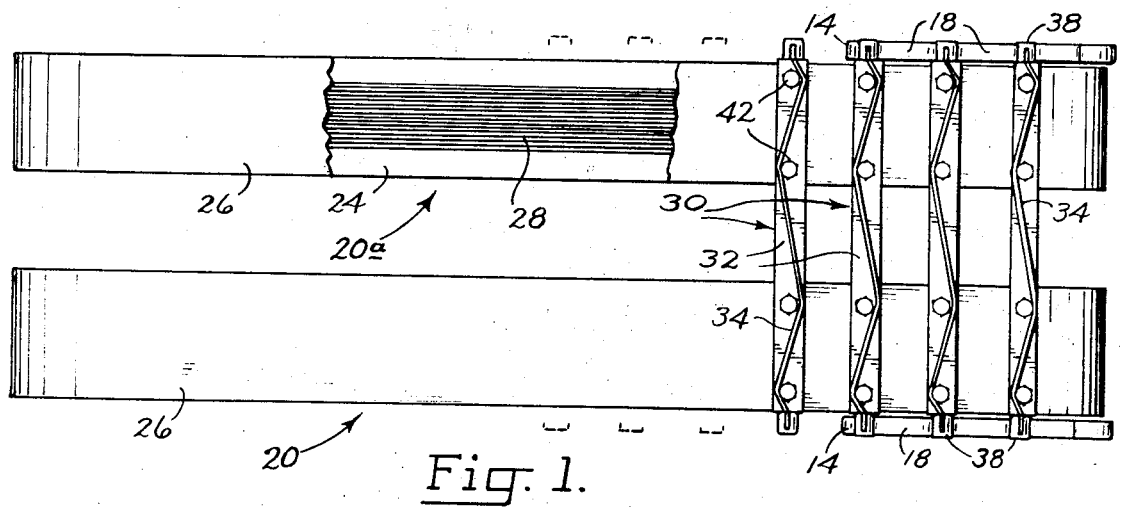
FIG. 1 is a fragmentary, bottom plan view of the herein described track assembly, partly broken away to show interior construction.

Considering the foregoing in greater detail and with particular reference to the drawings:

As shown particularly in FIG. 1, the herein described track assembly is designed for mounting on at least one, preferably two or more longitudinally spaced support wheels or bogeys 10. Depending upon the contemplated use, the bogeys are fitted with pneumatic or non-pneumatic tires and are rotatably mounted on shaft 12 carried by the frame of the tractor.

The track assembly further is adapted for use with a pair of drive sprockets 14 fixed to a drive shaft 16. The sprockets are provided with peripheral teeth 18 in the usual manner. Two such sprockets are provided for increased performance and stability.

For the same reasons, there are provided a pair of endless belts 20, 20a. These are of sufficient length to accommodate wheels 10 and sprockets 14.

The belts preferably have a two or multiple ply construction. This enables their manufacture from conventional commercial belting of relatively low cost. Thus each belt comprises an inner ply 24 and an outer ply 26, the one overlying the other in face to face registering relation.

It is a feature of the invention that the belt construction is such as to eliminate lumpy splices which cause the track to bump in operation, and stiff areas lacking pliability and resulting in throwing the assembly out of time.

Figure 2:
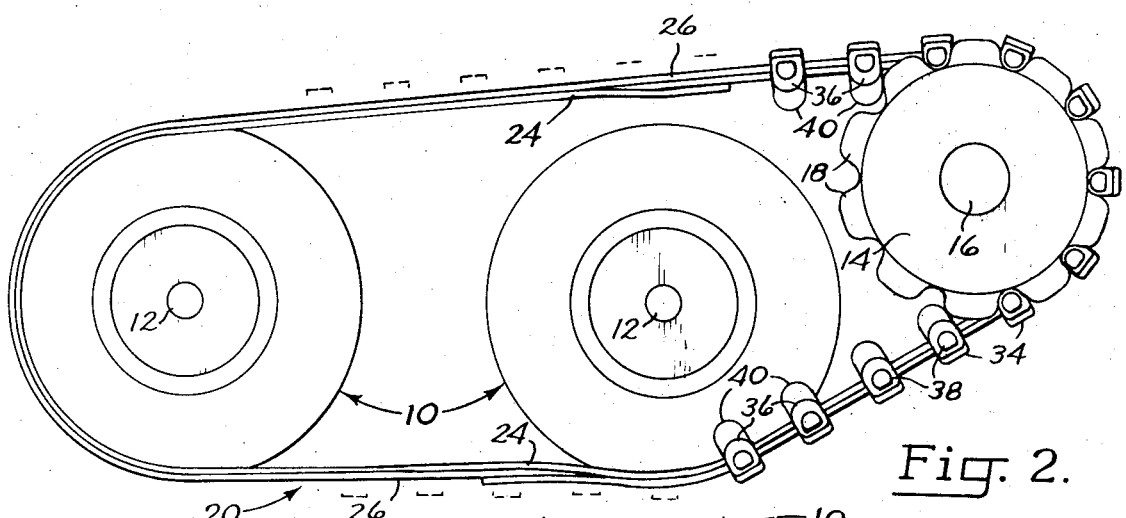
FIG. 2 is a view in side elevation of the assembly.

This objective is attained by practicing the unique splicing and fastening methods illustrated in FIG. 2.

The ends of inner ply 24 are overlapped, as are the ends of outer ply 26. The overlapped areas of the two belts are positioned at substantially 180° from each other. The overlapped areas of the companion belt 20a also are positioned at approximately 180° from each other, as well as at 90° from the overlapped areas of belt 20. This eliminates the presence at a particular location of a massive lump which would produce a massive bump.

Alternatively the presence of lumpy splices in the belts may be minimized by making the two belts on each side in one piece, allowing one of the belts to make two full laps and lapping the ends at one point only. In this manner there is one overlap only on each side, or two per track. These are mounted so that one is 180° from the other.

If greater strength is required in the belts, one or both of them may have inserted between the plies a plurality of flexible strands 28. These are arranged longitudinally of the belts, side by side, in the manner illustrated in FIGS. 1 and 3. They may comprise to advantage lengths of flexible wire, or small cable.

Figure 5:
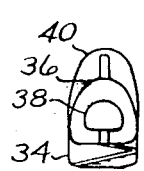
FIGS. 3, 4 and 5 are views in side elevation, plan, and end elevation of an integral combination grouser and wheel guide employed in the assemblies of FIGS. 1 and 2.
Figure 3:
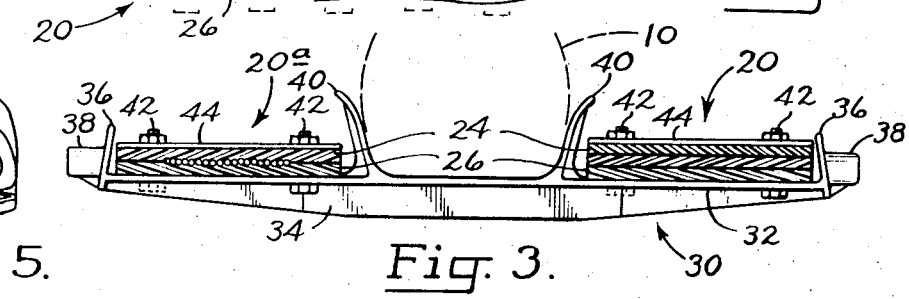
Figure 4:
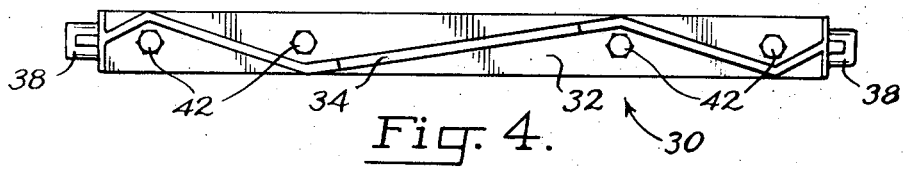

Belts 20, 20a mount a plurality of combination grouser and wheel guide units, the construction of which is shown particularly in FIGS. 3, 4 and 5.

These units are placed transversely across the belts at longitudinally spaced intervals. They serve as the members which engage the ground, drive the track, and guide the track about guide wheels 10.

Each grouser unit, indicated generally at 30, includes as a base an elongated bar 32 made from steel or other stout metal of suitable thickness, dimensions and shape. A tread 34 of the desired configuration projects outwardly from the bar.

Side plates 36 are mounted on the ends of the bar. These incline inwardly at a slightly oblique angle. They serve as shields for belts 20, 20a and also assist in insuring proper meshing of sprockets 14 with the tracks.

Sprockets 14 are engaged by lugs 38 which extend axially outwardly from the ends of bar 32 and are dimensioned to be received in the recesses of the sprockets.

The wheel guide element of the grouser unit is mounted centrally of bar 32. It consists of a pair of spaced tabs or plates 40 which lie at a slightly oblique angle in the outward direction. The spacing between them is such as to accommodate the tires of support wheels 10.

The entire grouser unit thus may be simply, inexpensively and advantageously fabricated in a single integral piece by the application of conventional metal casting techniques.

If desired, however, the guides may be made as separate pieces and bolted to the grousers in the desired location.

Belts 20, 20a are secured to the grouser units in the areas lying between the end plates 36 and guide members 40. Preferred members for securing them comprise bolts 42 and belt plates 44. The latter may be fabricated from steel, aluminum or other suitable structural material. It will be observed that not only do bolts 42 attach the grouser units to the belts; they also hold together the spliced portions of the belts, as is particularly evident in FIG. 3.

There thus is provided a track assembly fabricated from low cost belting and integral, low cost grouser-guide units, which assembly is characterized by stability, long life, high performance and operating economy.

Having thus described my invention in preferred embodiments, I claim as new and desire to protect by letters patent:

1. A track assembly for tracked vehicles having on each side at least one support wheel and a pair of laterally spaced drive sprockets, the track assembly comprising:
    a. a pair of laterally spaced, endless belts mountable about the wheel and sprockets,
    b. a plurality of grousers arranged in longitudinally spaced relation transversely of the belts,
    c. grouser fastening means fastening the grousers to the belts,
    d. each grouser comprising a unitary metal casting including a bar having a pair of flat inner surface portions, a pair of end plates one adjacent each end of the bar extending generally perpendicularly from said flat inner surface for guiding the sprockets, a pair of lateral extensions one on each end of the bar extending outwardly from the end plates and having curved surfaces dimensioned to mesh with the sprockets, a ground-gripping tread projecting outwardly from the outer surface of the bar, and a pair of laterally spaced, outwardly divergent wheel guide tabs formed integrally with the bar extending inwardly of the bar and contoured and dimensioned to receive the support wheel between them in guiding relation.

2. A track assembly for tracked vehicles having on each side at least one support wheel and a pair of laterally spaced drive sprockets, the track assembly comprising
    a. a pair of laterally spaced, endless belts mountable about the wheel and sprockets,
    b. a plurality of grousers arranged in longitudinally spaced relation transversely of the belts,
    c. grouser fastening means fastening the grousers to the belts, and
    d. a pair of wheel guides extending inwardly from each grouser between the belts and positioned for receiving the support wheel therebetween,
    e. each belt comprising throughout its length at least two separate plies of flexible belt material secured together and to the grousers by grouser fastening means and having their respective meeting ends lapped and fastened to each other at one of said grousers.

3. The track assembly of claim 2 including a plurality of strands of flexible reinforcing and strengthening material interposed between the lapped plies and running longitudinally thereof.

* * * * *